United States Patent
Silken et al.

[11] Patent Number: 5,264,834
[45] Date of Patent: Nov. 23, 1993

[54] POWER EQUIPMENT WARNING DEVICE

[76] Inventors: Howard Silken, 5600 Forest Oaks Terr.; Edward Frieling, 5670 Willow Creek Ct., both of Delray Beach, Fla. 33484

[21] Appl. No.: 871,061

[22] Filed: Apr. 20, 1992

[51] Int. Cl.$^5$ .......................................... G08B 21/00
[52] U.S. Cl. .................................. 340/679; 49/31; 318/103; 340/522; 340/540; 340/825.31
[58] Field of Search ........... 340/679, 540, 522, 825.31; 318/103; 49/31

[56] References Cited

U.S. PATENT DOCUMENTS

| | | | |
|---|---|---|---|
| 3,298,010 | 1/1967 | DuBosa | 360/5 |
| 3,631,447 | 12/1971 | Sulat et al. | 340/679 |
| 3,827,040 | 7/1974 | Simmons | 340/568 |
| 4,785,293 | 11/1988 | Shearer et al. | 49/31 |
| 4,821,024 | 4/1989 | Bayha | 340/540 |
| 4,987,403 | 1/1991 | Apfel | 340/457 |
| 5,165,107 | 11/1992 | Hand et al. | 340/679 |

OTHER PUBLICATIONS

Safety Announcement System Brochure.

*Primary Examiner*—Glen R. Swann, III
*Attorney, Agent, or Firm*—Alvin S. Blum

[57] ABSTRACT

A safety message announcing device is interconnected to a machine so as to make the machine inoperative until the safety message has been announced. A control signal is provided along with the safety message. A control mechanism interconnected to the start switch of the machine will only operate when the control signal is received. The control signal may take the form of multiple fixed frequency tones announced along with the message, with the control mechanism tuned to the tones to only enable the machine when the tones are heard by the control mechanism, thus assuring that the message has been announced as well. The control signal may take the form of a code that must be input by the operator before the machine will operate. This may be done with a visual as well as a sound annunciator.

15 Claims, 1 Drawing Sheet

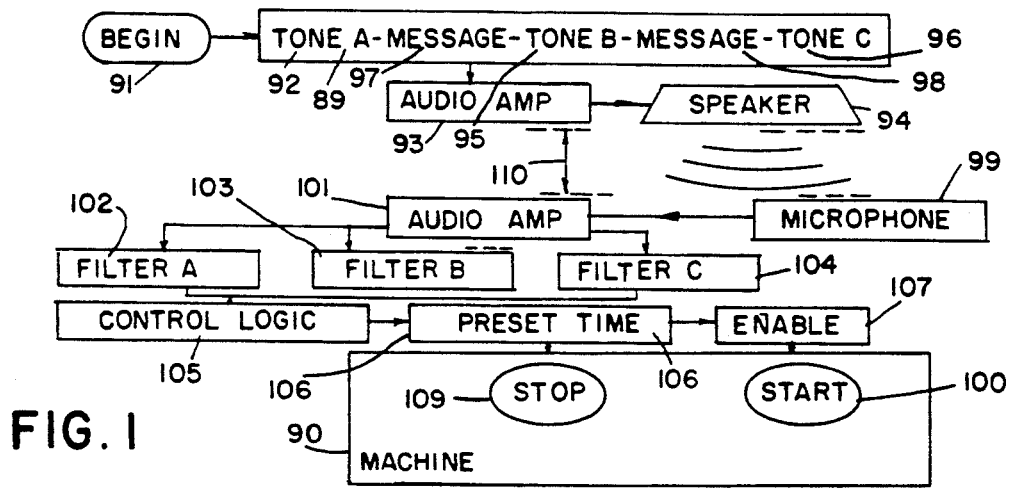
FIG. 1
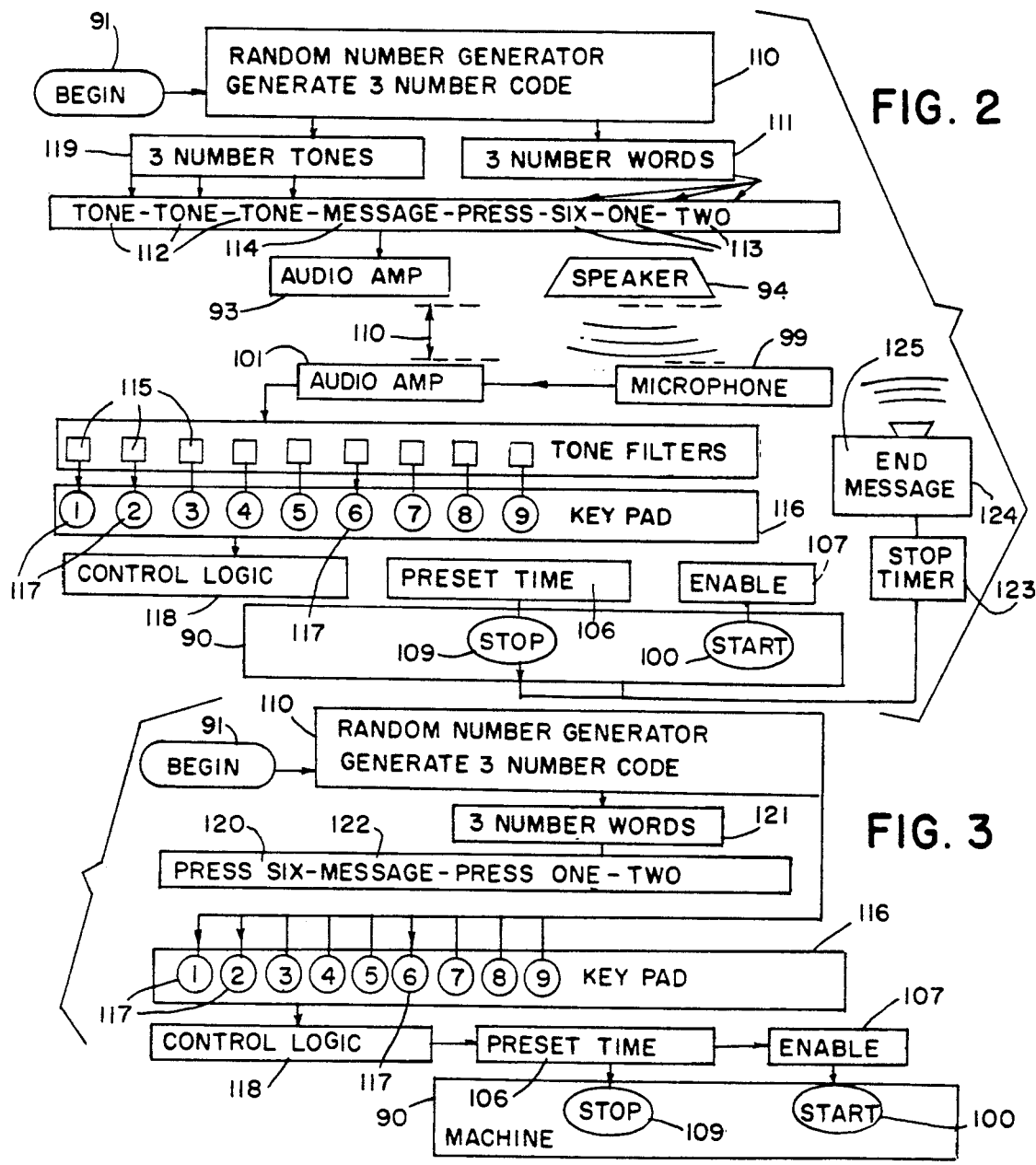
FIG. 2
FIG. 3

POWER EQUIPMENT WARNING DEVICE

BACKGROUND OF THE INVENTION

This invention relates to warning devices and more specifically to means for advising a user of power equipment of safety instructions, the system ensuring that the instructions are given before the equipment may be operated.

Power tools, such as circular saws, are inherently dangerous and must not be used by those unfamiliar with the dangers of their use. The manufacturers of such equipment warn potential users of the dangers inherent in their use by instruction manuals, warning placards and the like. Despite their best efforts, users are injured and lawsuits frequently result. The plaintiff often testifies that he did not receive the appropriate warning instructions, the placard, manual etc. were not provided, legible etc. It is difficult for a manufacturer to convince a jury that a machine, ten years after it left the factory, did have appropriate, legible warning instruction and that the user received them. Since many injuries occur in training situations such as school workshops, it would be useful to provide a system that was relatively foolproof for always instructing a user before operation of the machine. It would be helpful to the defense of a manufacturer of a machine to be able to provide convincing evidence that such instructions were given and received.

U.S. Pat. No. 3,827,040 issued Jul. 30, 1974 to Simmons teaches a safety warning device that actuates an alarm when safety equipment is not removed from an operator arm. This assumes that the safety equipment is returned to the arm after use. U.S. Pat. No. 4,987,403 issued Jan. 22, 1991 to Apfel and U.S. Pat. No. 3,298,010 issued Jan. 10, 1967 to DuBosq teach devices that produce audible warnings and announcements to a machine operator related to particular conditions, but there is no assurance that the messages have been generated.

Clever Devices Ltd of Glenwood Landing, N.Y. provides a Safety Announcement System which is a solid state device that stores safety warnings digitally and announces them through an audio speaker whenever anyone passes within view of one of their various sensors. Once again, there is no certainty that the message has been audibly generated or received. Such a system could also be an annoyance to a single operator moving about a workshop.

SUMMARY OF THE INVENTION

It is accordingly an object of the invention to provide a warning message or messages to an operator of a potentially dangerous machine before the operator uses the machine in a readily intelligible form. It is another object of the invention that the warning device have mechanisms for ensuring that the message has been received before the machine may be operated.

The power equipment warning device of the invention comprises a start switch, an audible sound generation means containing stored safety messages responsive to the start switch for generating audible warning messages and signals upon operation of the start switch and means responsive to the audible sound for enabling operation of the machine. The machine is interlocked to the audible sounds so that it is inoperable unless the particular audible sounds have been generated. In this way, there is a greater certainty that the safety messages have been received by the operator before use of the machine. The safety warning device may further be interlocked to the machine to sound a safety warning after the machine has been turned off to avoid a coasting cutter blade or the like that is often responsible for injury.

In one embodiment of the invention, certain of the sounds produced are received by an audio receiving device which then enables operation of the machine. In another embodiment of the invention a unique code is announced and the operator is required to enter that code to enable operation of the machine.

These and other objects, advantages and features of the invention will become more apparent when the detailed description of the invention is studied in conjunction with the drawings, in which:

BRIEF DESCRIPTION OF THE DRAWINGS

FIG. 1 is a block diagram of a warning device of the invention using multiple tones.

FIG. 2 is a block diagram of another warning device of the invention employing a random code announcement that must be entered by the operator.

FIG. 3 is a block diagram of a video embodiment of the invention.

DETAILED DESCRIPTION OF PREFERRED EMBODIMENTS

Referring now first to FIG. 1, a block diagram shows an audio device for delivering a safety message. To operate the machine 90, the user must first press the BEGIN button 91. This causes a signal permanently stored in memory, such as the read only memory (ROM) 92, to be converted to a strong analog signal in audio amplifier 93 that is converted to sound waves by annunciator or loudspeaker 94. The sound signal includes a first fixed frequency tone A, 89, a first portion of the safety message, 97, a second different fixed frequency tone B, 95, a second portion of the safety message 98, and a third different fixed frequency tone C, 96. In order for the START button 100 of the machine to be operable, the microphone 99 must receive the sound waves from the speaker 94. This will provide assurance that the sound waves were produced that announced the warnings message to the user. The sound waves enable the START button 100 by the following mechanism.

The sounds picked up by microphone 99 are amplified by receiver amplifier 101 and fed to three narrow band pass filters 102, 103, 104 tuned to the tone frequencies A, B and C, respectively. When control logic 105 senses that all three tones have been received for predetermined time intervals, it actuates a preset time interval timer 106 that actuates an enable mechanism 107 that enables START button 100 only during the preset time interval. The start button will not operate before or after the time interval has expired. Whenever the STOP button 109 is actuated to stop the machine, the time interval begins again. This provision enables a user to shut off the machine periodically without having to listen to the warning message again, while requiring a new user, coming to the machine after it has been off for an interval, to listen to the warning message. In effect, there is a "sound barrier" 110 between BEGIN button 91 and START button 100 that can only be bridged by sound, thus ensuring that the message has been audibly delivered.

Referring now to the block diagram of FIG. 2, another embodiment for bridging the "sound barrier" 110 is shown that not only ensures that the sound has been delivered, but also ensures that the user has heard it. The BEGIN button 91 activates random number generator 110 that generates a code consisting of three numbers from 1 to 9. For illustration, the code generated is shown as six-one-two. This is converted into three audio signals 113 for the words for the numbers in converter 111. Each number is also converted into a unique fixed frequency tone 112 by tone generator 119. There are nine tones, one for each number. The audio signal amplified by amplifier 93 and converted to sound waves by speaker 94 comprises the three tones 112 representative of the three code digits, the warning message 114 and the words for the digits preceded by the word "press". There are nine narrow band pass audio filters 115, one tuned to the audio frequency of each of the tones representing a digit. Whenever a tone passes through a filter, it enables a numbered key 117 on keypad 116. The keypad 116 is connected to control logic 118 in such fashion that only when the enabled keys are pressed do the preset timer 106 and enable circuit 107 operate to enable the START button. If other keys are depressed, the system stops and the BEGIN button must be actuated to go through the cycle again. This ensures that the user has heard the message, because he must know the correct code before the machine will operate.

When the operator turns the power to the machine off, a different warning message is played which warns the operator to keep his hands away from the coasting blades or cutters. This is called the end message.

Operation of stop button 109 actuates timer 123 which operates an annunciator 124 to play back an end message 125 stored therein.

A typical warning message for a radial arm saw in the cross cut mode is as follows:

Warning! Warning! You are about to operate a potentially dangerous machine. Do not use it unless you have been given and understand the instructions on its use. Be sure that upper and lower blade guards are on and are working. Lower the anti-kick-back rod to just clear the surface of the material you will be cutting. Place material snug to the fence before cutting. Pull the saw slowly but firmly until the material has just been severed. Then—return the saw to the full retract position. Turn the machine off. After the blade has stopped rotating you can pick up the cut pieces. Keep your hands at least eight inches clear of the blade at all times.

A typical end message played after turning the machine off is as follows:

Keep hands clear of cutting area and the coasting cutter. Remove cut pieces after the blade has stopped rotating.

Referring now to FIG. 3, a block diagram is shown of a visible warning system that ensures that the user has seen the warning message before operation of the machine. It employs a moving visible annunciator or display 120 of the type well known for attention-getting signs. Stored in the display is the visible warning message 122. The moving display also displays the three digit code generated by operation of BEGIN switch 91. This actuates the random number generator 110 which generates three numbers which are transformed to visible words for the numbers in number converter 121 which are entered into the moving display. One digit precedes the message and two digits follow the message. The random number generator also enables the appropriate numbered keys 117 on keypad 116. If the user has seen the message, and can read, then it is clear what keys must be pressed in order to enable the START switch 100 on the machine 90 as described for the apparatus of FIG. 2.

This embodiment would be useful for deaf students, for example.

The above disclosed invention has a number of particular features which sould preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

We claim:

1. A safety warning device for use in conjunction with a machine that has start and stop controls for ensuring that a safety message has been delivered to an operator of the machine before the machine is started, the warning device comprising:
   a) start control enabling means for enabling operation of a start control of a machine;
   b) permanent message storage means for storing a message to be conveyed to an operator before machine operation is enabled;
   c) conversion means for converting said message from a stored form to an operator discernible form;
   d) annunciator means for announcing said message in an operator discernible form, said form selected from the group of discernible forms consisting of sound waves and visible displays;
   e) begin switch means for initiating annunciation of said message; and
   f) control means responsive to a control signal for actuating said enabling means only after said message has been announced,
      said control signal being conveyed along with said message by said annunciator means, said control signal operative upon said control means for actuating said enabling means, whereby said start control cannot be used to operate the machine until the message has been announced.

2. The device according to claim 1, in which said control means includes a preset time interval timer means for providing a preset time interval during which said enabling means is actuated.

3. The device according to claim 2, in which the preset time interval is begun anew whenever the stop control of the machine is actuated.

4. The device according to claim 3, in which said control signal comprises a code and said control means includes operator input means for operator input of said code to ensure that the operator has discerned the message before the machine may be operated.

5. The device according to claim 4, in which said discernible form is sound waves; said control signal further comprises a plurality of fixed frequency tones; and said control means includes means responsive to said fixed frequency tones, whereby said start control cannot be used to operate the machine until the message has been announced and said code has been input.

6. The device according to claim 3, in which said discernible form is sound waves; said control signal comprises a plurality of fixed frequency tones; and said control means includes means responsive to said fixed frequency tones, whereby said start control will not be enabled until said message with said tones has been announced by said annunciator means.

7. The device according to claim 3 further comprising end message means actuated by the stop control of the machine for conveying an end message related to conditions which obtain when the machine is stopped.

8. A safety warning device for use in conjunction with a machine that has start and stop controls for ensuring that a safety message has been delivered to an operator of the machine before the machine is started, the warning device comprising:
   a) start control enabling means for enabling operation of a start control of a machine;
   b) permanent message storage means for storing a message to be conveyed to an operator before machine operation is enabled;
   c) conversion means for converting said message from a stored form to an operator discernible form;
   d) annunciator means for announcing said message in audible form;
   e) begin switch means for initiating annunciation of said message; and
   f) control means responsive to a control signal for actuating said enabling means only after said message has been announced,
   said control signal being in the form of a plurality of fixed frequency audio tones conveyed along with said message by said annunciator means, said control signal operative upon said control means for actuating said enabling means, whereby said start control cannot be used to operate the machine until the control signal means along with the message has been announced.

9. The device according to claim 8, in which said control means includes a preset time interval timer means for providing a preset time interval during which said enabling means is actuated.

10. The device according to claim 9, in which the preset time interval is begun anew whenever the stop control of the machine is actuated.

11. The device according to claim 10, further comprising end message means actuated by the stop control of the machine for announcing an end message related to conditions which obtain when the machine is stopped.

12. The device according to claim 8, in which said control signal comprises an operator discernible code and said control means includes operator input means for operator input of said code to ensure that the operator has discerned the message before the machine may be operated, by requiring input of said code each time said start control is to be operated.

13. The device according to claim 12 further comprising end message means actuated by the stop control of the machine for conveying an end message related to conditions which obtain when the machine is stopped.

14. The device according to claim 13 further comprising key actuated disable means interconnected to said control means, whereby removal of a key disables said control means and requires actuation of said begin switch means and conveyance of a new code before operation can be resumed.

15. A safety warning device for use in conjunction with a machine that has start and stop controls for ensuring that a safety message has been delivered to an operator of the machine before the machine is started, the warning device comprising:
   a) start control enabling means enabling operation of a start control of a machine;
   b) permanent message storage means storing a message to be conveyed to an operator before machine operation is enabled;
   c) conversion means converting said message from a stored form to an operator discernible form;
   d) annunciator means announcing said message in audible form;
   e) begin switch means initiating annunciation of said message; and
   f) control means responsive to a control signal conveyed along with said message by said annunciator means, said control signal including a code in the form of a plurality of characters generated by a random character generator means, said
   control means functioning to actuate said enabling means, said control means including operator input means for operator input of said code, wherein said enabling means can only be actuated after input of said code to ensure that the message has been discerned by the operator.

* * * * *